United States Patent
Watanabe et al.

(10) Patent No.: US 6,337,129 B1
(45) Date of Patent: Jan. 8, 2002

(54) ANTIFOULING MEMBER AND ANTIFOULING COATING COMPOSITION

(75) Inventors: Toshiya Watanabe; Makoto Hayakawa; Mitsuyoshi Machida, all of Kitakyushu (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 09/201,499

(22) Filed: Nov. 30, 1998

Related U.S. Application Data (63) Continuation of application No. PCT/JP97/01872, filed on Jun. 2, 1997.

(51) Int. Cl.$^7$ .............................. B32B 5/16; B01J 21/06
(52) U.S. Cl. ........................ 428/328; 428/331; 428/421; 428/423.1; 428/447; 428/480; 428/522; 502/309; 502/310; 502/336; 502/338; 502/343; 502/350; 502/352; 502/527.12
(58) Field of Search .............................. 427/2.24, 2.28, 427/2.3; 428/328, 331, 421, 423.1, 447, 480, 500, 522; 502/242, 244, 250, 251, 252, 253, 257, 258, 261, 307, 309, 310, 311, 313, 316, 317, 318, 320, 323, 327, 329, 331, 336, 338, 342, 343, 345, 346, 347, 348, 350, 351, 352, 353, 354, 527.12

(56) References Cited

U.S. PATENT DOCUMENTS 3,347,816 A    10/1967    Krauss et al.

(List continued on next page.)

FOREIGN PATENT DOCUMENTS

EP    0433915 A1    6/1991

(List continued on next page.)

*Primary Examiner*—D. S. Nakarani
(74) *Attorney, Agent, or Firm*—Jones, Day, Reavis & Pogue (57) ABSTRACT

Disclosed is a member having an antifouling surface on which the so-called "stains," such as deposits and contaminants, are less likely to be deposited. The surface of the member has both a hydrophobic portion, and a hydrophilic portion induced by a photocatalyst, the hydrophobic portion and the hydrophilic portion being present in a microscopically dispersed and exposed state on the surface. More specifically, according to a first aspect of the present invention, there is provided a member comprising: a substrate; and a surface layer provided on the substrate, the surface layer comprising a photocatalytic oxide, a silicone resin or silica, and a water-repellent fluororesin, the silicone or silica and the water-repellent fluororesin being present in a microscopically dispersed and exposed state on the outermost surface of the surface layer. According to a second aspect of the present invention, there is provided a member comprising: a substrate; and a surface layer provided on the substrate, the surface layer comprising a hydrophobic resin and a photocatalytic oxide, the hydrophobic resin and the photocatalytic oxide being present in a microscopically dispersed and exposed state on the outermost surface of the surface layer, the photocatalytic oxide being self-hydrophilified or functioning to hydrophilify the photocatalytic oxide still remaining unhydrophilified present around the photocatalytic oxide by photocatalytic action created in response to photoexcitation. In this surface where the hydrophobic portion and the hydrophilic portion are present adjacent to each other, a hydrophilic deposit having affinity for the hydrophilic portion does not have affinity for the adjacent water-repellent portion. On the other hand, a hydrophobic deposit having affinity for the hydrophobic portion does not have affinity for the adjacent hydrophilic portion. Therefore, both the hydrophilic deposit and the hydrophobic deposit cannot be deposited on the surface of the member, and, even when deposited on the surface of the member, are unstable and hence are easily removed, permitting the surface of the member to be kept clean.

17 Claims, 2 Drawing Sheets

U.S. PATENT DOCUMENTS

| | | | |
|---|---|---|---|
| 3,451,833 A | 6/1969 | Bonitz et al. |
| 3,976,497 A | 8/1976 | Clark |
| 4,954,465 A | 9/1990 | Kawashima et al. |
| 4,955,208 A | 9/1990 | Kawashima et al. |
| 5,547,823 A | 8/1996 | Mursawa et al. |
| 5,595,813 A | 1/1997 | Ogawa et al. |
| 5,616,532 A | 4/1997 | Heller et al. |
| 5,643,436 A | 7/1997 | Ogawa et al. |

FOREIGN PATENT DOCUMENTS

| | | |
|---|---|---|
| EP | 0614682 A1 | 3/1994 |
| EP | 0590477 A1 | 4/1994 |
| EP | 0636702 A1 | 2/1995 |
| JP | 60-221702 | 11/1985 |
| JP | 61-083106 | 4/1986 |
| JP | 61-091042 | 5/1986 |
| JP | 63005301 | 1/1988 |
| JP | 63-100042 | 5/1988 |
| JP | 3-101926 | 4/1991 |
| JP | 4-174679 | 6/1992 |
| JP | 04174679 | 6/1992 |
| JP | 05302173 A | 11/1993 |
| JP | 5-302173 | 11/1993 |
| JP | 6-278241 | 10/1994 |
| JP | 6-298520 | 10/1994 |
| JP | 6-315614 | 11/1994 |
| JP | 7-051646 | 2/1995 |
| JP | 7-113272 | 5/1995 |
| JP | 08141503 A | 6/1995 |
| JP | 7-171408 | 7/1995 |
| JP | 8-3544 | 1/1996 |
| JP | 8-34973 | 2/1996 |
| JP | 8034973 | 2/1996 |
| JP | 8-119673 | 5/1996 |
| JP | 8-134381 | 5/1996 |
| JP | 8-134437 | 5/1996 |
| JP | 8-164334 | 6/1996 |
| JP | 8-313705 | 11/1996 |
| JP | 09024335 A | 1/1997 |
| JP | 09100437 A | 4/1997 |
| JP | 09173783 | 7/1997 |
| JP | 09227157 | 9/1997 |
| JP | 09227458 | 9/1997 |
| JP | 09235140 | 9/1997 |
| JP | 09241037 | 9/1997 |
| WO | WO9511751 | 5/1995 |
| WO | WO96/29375 | 9/1996 |

OTHER PUBLICATIONS

Nippon Kagaku Kaishi, 1986 (1), 8–11, "Photo Sinking of Titanium(IV) Oxide Powders" (English Translation).

Denki Kagaku, vol. 54, No. 2(1986), pp–153–158 "Image Formation on a Treat Tio2 Anode to by Hydrophobic" (English Translation).

Hyomen (Surface), vol. 27, No. 9 (1989) "Hydrophobilization of the Surface of SolidCatalyst" (English Translation).

Pt–Tio$_2$ thin films on glass substrates as efficient photocatalysts (Journal of Material Science 24 (1989) Jan., No. 1, London.

ANTIFOULING MEMBER AND ANTIFOULING COATING COMPOSITION

This application is a Continuation of PCT/JP01872 filed Jun. 2, 1997.

BACKGROUND OF THE INVENTION

1. Field of the Invention

The present invention relates to a member having a surface on which a material is less likely to be deposited, more specifically a member having an antifouling surface on which the so-called "stains," such as deposits and contaminants, are less likely to be deposited, and a composition for the production of a member having such a surface. The present invention also relates to a method for imparting, to the surface of a desired member, such a property that a material is less likely to be deposited thereon, more specifically a method for imparting such a property that stains, such as deposits and contaminants, are less likely to be deposited.

2. Background Art

In the field of buildings and coatings, the pollution of the environment has posed a problem of contamination of exterior materials for buildings, outdoor buildings, and coatings provided thereon.

Dust and particles floating in the air deposit on the roof and the outer wall of buildings in fine weather. Upon exposure to rainfall, the deposits flow together with rainwater and flow down along the outer wall of the building. Further, in rainy weather, dust and particles floating in the air are carried by rain and flow down on the outer wall of the building and the surface of the outdoor building. As a result, the contaminant adheres on the surface along the course of the rainwater. As the surface dries, soil appears in a stripe pattern on the surface.

Combustion products, such as carbon black, municipal dust, and contaminants of inorganic materials, such as clay particles, constitute the soil on the coating of the exterior material for the building. Such a wide variety of contaminants are considered to render measures for antifouling complicate (Yoshinori Kitsutaka, "Gaiheki Shiage Zairyou No Osen No Sokushin Shiken Houhou (Accelerated Testing Method for Contamination of Finish Materials of Outer Wall)," Journal of Structural and Construction Engineering (Transactions of AIJ), No. 404, October 1989, pp. 15–24).

The use of a water-repellent paint, such as polytetrafluoroethylene (PTFE), has hitherto been considered preferable for preventing the exterior of the building and the like from being soiled. In recent years, however, that the surface of the coating is made hydrophilic as much as possible has become recognized as more effective for municipal dust containing a large amount of a hydrophobic component (Kobunshi, Vol. 44, May 1995. p. 307). Accordingly, coating of buildings with a hydrophilic graft polymer has been proposed in a newspaper ("Japan Chemical Week", Jan. 30, 1995). According to this report, the coating has a hydrophilicity of 30 to 40° in terms of contact angle thereof with water.

Inorganic dust typified by clay minerals has a contact angle thereof with water of 20° to 50° and, hence, has affinity for the graft polymer having a contact angle thereof with water of 30° to 40° and is likely to adhere on the surface of the graft polymer. Therefore, it is considered that the coating of the graft polymer cannot satisfactorily prevent soiling with inorganic dust.

Although there are proposals wherein the surface of a member is rendered water-repellent or hydrophilic to keep the surface clean, such as those described above, there is still room for improvement in the surface cleaning activity.

SUMMARY OF THE INVENTION

The present inventors have now found that a surface having both a hydrophobic portion, and a hydrophilic portion induced by a photocatalyst has a very good antifouling property. The present invention has been made based on such finding.

Accordingly, an object of the present invention is to provide a member having a surface on which a material is less likely to be deposited.

Another object of the present invention is to provide a member having an antifouling surface on which the so-called "stains," such as deposits and contaminants, are less likely to be deposited.

The member according to the present invention has both a hydrophobic portion, and a hydrophilic portion induced by a photocatalyst, the hydrophobic portion and the hydrophilic portion being present in a microscopically dispersed and exposed state on the surface of the member.

According to a first aspect of the present invention, there is provided a member comprising: a substrate; and a surface layer provided on the substrate, the surface layer comprising a photocatalytic oxide, a silicone resin or silica, and a water-repellent fluororesin, the silicone or silica and the water-repellent fluororesin being present in a microscopically dispersed and exposed state on the outermost surface of the surface layer.

According to a second aspect of the present invention, there is provided a member comprising: a substrate; and a surface layer provided on the substrate, the surface layer comprising a hydrophobic resin and a photocatalytic oxide, the hydrophobic resin and the photocatalytic oxide being present in a microscopically dispersed and exposed state on the outermost surface of the member, the photocatalytic oxide being self-hydrophilified or functioning to hydrophilify the photocatalytic oxide still remaining unhydrophilified present around the photocatalytic oxide by photocatalytic action created in response to photoexcitation.

In both the aspects of the present invention, the hydrophobic portion derived from the hydrophobic resin and the hydrophilic portion induced by the photocatalyst are present in a microscopically dispersed state on the outermost surface of the member. As a result of the hydrophobic portion and the hydrophilic portion adjacent to each other, a hydrophilic deposit having affinity for the hydrophilic portion does not have affinity for the adjacent water-repellent portion. On the other hand, a hydrophobic deposit having affinity for the hydrophobic portion does not have affinity for the adjacent hydrophilic portion. Therefore, it is considered that both the hydrophilic deposit and the hydrophobic deposit cannot deposit on the surface of the member, and, even when deposited on the surface of the member, are unstable and hence are easily removed, permitting the surface of the member to be kept clean. In this connection, however, it should be noted that the above description is hypothetical and the present invention is not limited to the above mechanism alone.

BRIEF DESCRIPTION OF THE DRAWINGS

The surface layer 3 comprises: a silicone or silica layer 4; and a water-repellent fluororesin 5 and a photocatalytic oxide 6 dispersed in the silicone or silica layer 4. A part of the water-repellent fluororesin 5 is exposed on the outermost surface of the silicone or silica layer 4.

FIG. 5 is a diagram showing a second embodiment of the second aspect of the present invention. A member 21 according to the present invention comprises a layer 24, formed of a photocatalytic oxide, and a layer 28, formed of a hydrophobic resin, provided on the layer 24. In this case, the layer 28 formed of a hydrophobic resin is laminated onto a part of the layer 24. As a result, the hydrophobic resin and the photocatalytic oxide are present in a microscopically dispersed and exposed state on the outermost surface of the surface layer 23.

DETAILED DESCRIPTION OF THE INVENTION

Definition

In the present invention, the terms "antifouling property" and "antifouling activity" are used to mean any of such properties that a certain surface is inert to deposition of a material thereon, that is, a property that various materials are less likely to be deposited on a certain surface, and a property that materials, even when once deposited on a certain surface, can be easily removed.

Further, in the present invention, the presence of the hydrophobic portion and the hydrophilic portion in a "microscopically dispersed state" on the surface means that the hydrophobic portion and the hydrophilic portion are homogeneously present per unit area of not more than about 0.1 $mm^2$.

Further, in the present invention, the term "photocatalyst" used herein refers to a material which, when exposed to light (excitation light) having higher energy (i.e., shorter wavelength) than the energy gap between the conduction band and the valence band of the crystal, can cause excitation (photoexcitation) of electrons in the valence band to produce a conduction electron and a hole. Photocatalytic oxides usable herein include oxides, for example, anatase form of titanium oxide, rutile form of titanium oxide, zinc oxide, tin oxide, ferric oxide, dibismuth trioxide, tungsten trioxide, and strontium titanate.

Antifouling Member According to First Aspect of Invention

The member according to the first aspect of the present invention comprises a substrate and a surface layer provided on the substrate, the surface layer comprising a photocatalytic oxide, a silicone resin or silica, and a water-repellent fluororesin. The silicone or silica and the water-repellent fluororesin are present in a microscopically dispersed and exposed state on the outermost surface of the surface layer.

In this aspect of the invention, the presence of the water-repellent fluororesin in an exposed state on the outermost surface results in the formation of a hydrophobic portion on the outermost surface of the member.

On the other hand, silicone or silica is exposed on the outermost surface. According to the present invention, upon exposure of the surface of the member to light, the hydrophilic nature is further imparted to the silicone or silica by the action of the photocatalytic oxide present in the surface layer, and this hydrophilic nature persists so far as light irradiation is continued. Further, even though the light irradiation is once stopped, the hydrophilic nature is again imparted upon resumption of the light irradiation. The mechanism of hydrophilification has not been elucidated yet. However, it is considered that, for example, in the case of the silicone, an organic group bonded to a silicon atom in the silicone molecule is at least partially replaced by a hydroxyl group to exhibit hydrophilicity. This hydrophilification results in the formation of a hydrophilic portion on the outermost surface of the member according to the present invention.

As described above, as a result of the presence of both the hydrophobic portion and the hydrophilic portion induced by the photocatalyst on the outermost surface of the member, both hydrophilic deposits and hydrophobic deposits cannot be deposited on the surface of the member, and, even when deposited on the surface of the member, are unstable and hence are easily removed, permitting the surface of the member to be kept clean.

Figure 1:
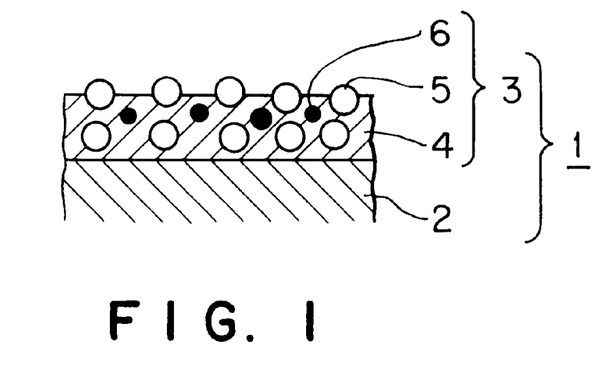
FIG. 1 is a diagram showing the structure of a member according to a first aspect of the present invention. A member 1 according to the present invention comprises a substrate 2 and a surface layer 3 provided on the substrate 2.

A preferred embodiment of the first aspect of the present invention is shown in FIG. 1. In FIG. 1, a member 1 comprises a substrate 2 and a surface layer 3 provided on the substrate 2. The surface layer 3 comprises: a silicone or silica layer 4; and a water-repellent fluororesin 5 and a photocatalytic oxide 6 dispersed in this layer 4. A part of the water-repellent fluororesin 5 is exposed on the outermost surface of the silicone or silica layer 4. In the embodiment shown in FIG. 1, the silicone or silica is provided as having a layer structure, while the water-repellent fluororesin and the photocatalytic oxide are provided as a particle.

In this embodiment, the photocatalytic oxide may be used as described above. When the photocatalytic oxide is anatase form of titanium oxide, rutile form of titanium oxide, zinc oxide, or strontium titanate, light from sunlight, a room lamp, a fluorescent lamp, a mercury lamp, an incandescent lamp, a xenon lamp, a high pressure sodium lamp, a metal halide lamp, a BLB lamp and the like is preferred. On the other hand, when the photocatalytic oxide is tin oxide, light from a bactericidal lamp, a BLB lamp and the like is preferred. The irradiation intensity of light applied may be suitably determined by taking into consideration the composition of the member, applications of the member and the like. In order to highly hydrophilify the hydrophilic portion of the surface of the member and maintain the highly hydrophilified state, the irradiation intensity of the excitation light is preferably not less than 0.001 $mW/cm^2$, more preferably not less than 0.01 $mW/cm^2$, most preferably not less than 0.1 $mW/cm^2$.

In the present embodiment, the silicone resin is represented by the following average composition formula (I)

$$R_p SiO_{(4-p)/2} \tag{I}$$

wherein

R represents a group selected from the group consisting of a hydrogen atom and one or more organic groups;

X represents an alkoxy group or a halogen atom; and p is a number satisfying $0 < p < 2$.

In this case, the organic group represented by R is an alkyl (more preferably an unsubstituted alkyl having 1 to 18 carbon atoms, most preferably an alkyl having 3 to 18 carbon atoms) or an aryl (preferably phenyl).

Specific examples of preferred silicone resins include hydrolyzates and hydration polycondensates of methyltrimethoxysilane, methyltriethoxysilane, methyltrichlorosilane, methyltribromosilane, methyltriisopropoxysilane, methyl-tri-t-butoxysilane, ethyltrimethoxysilane, ethyltriethoxysilane, ethyltrichlorosilane, ethyltribromosilane, ethyltriisopropoxysilane, ethyl-tri-t-butoxysilane, n-propyltrimethoxysilane, n-propyltriethoxysilane, n-propyltrichlorosilane, n-propyltribromosilane, n-propyltriisopropoxysilane, n-propyl-tri-t-butoxysilane, n-hexyltrimethoxysilane, n-hexyltriethoxysilane, n-hexytrichlorosilane, n-hexyltribromosilane, n-hexyltriisopropoxysilane, n-hexyl-tri-t-butoxysilane, n-decyltrimethoxysilane, n-decyltriethoxysilane, n-decyltrichlorosilane, n-decyltribromosilane, n-decyltriisopropoxysilane, n-decyl-tri-t-butoxysilane, n-octatrimethoxysilane, n-octatriethoxysilane, n-octatrichlorosilane, n-octatribromosilane, n-octatriisopropoxysilane, n-octa-tri-t-butoxysilane, phenyltrimethoxysilane, phenyltriethoxysilane, phenyltrichlorosilane, phenyltribromosilane, phenyltriisopropoxysilane, phenyl-t-butoxysilane, dimethyldichlorosilane, dimethyldibromosilane, dimethyldimethoxysilane, dimethyldiethoxysilane, diphenyldichlorosilane, diphenyldibromosilane, diphenyldimethoxysilane, diphenyldiethoxysilane, phenylmethyldichlorosi lane, phenylmethyldibromosilane, phenylmethyldimethoxysilane, phenylmethyldiethoxysilane, vinyltrichlorosilane, vinyltribromosilane, vinyltrimethoxysilane, vinyltriethoxysilane, vinyltriisopropoxysilane, vinyl-tri-t-butoxysilane, trifluoropropyltrichlorosilane, trifluoropropyltribromosilane, trifluoropropyltrimethoxysilane, trifluoropropyltriethoxysilane, trifluoropropyltriisopropoxysilane, trifluoropropyl-tri-t-butoxysilane, γ-glycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyl-tri-t-butoxysilane, γ-methacryloxypropylmethyldimethoxysilane, γ-methacryloxypropylmethyldiethoxysilane, γ-methacryloxypropyltrimethoxysilane, γ-methacryloxypropyltriethoxysilane, γ-methacryloxypropyltriisopropoxysilane, γ-methacryloxypropyl-tri-t-butoxysilane, γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminopropyl-tri-t-butoxysilane, γ-mercaptopropylmethyldimethoxysilane, γ-mercaptopropylmethyldiethoxysilane, γ-mercaptopropyltrimethoxysilane, γ-mercaptopropyltriethoxysilane, γ-mercaptopropyltriisopropoxysilane, γ-mercaptopropyl-tri-t-butoxysilane, β-(3,4-epoxycyclohexyl) ethyltrimethoxysilane, and β-(3,4-epoxycyclohexyl) ethyltriethoxysilane.

In the present embodiment, silica is preferably amorphous silica.

Further, in the present embodiment, preferred hydrophobic fluororesins usable herein include, for example, polymers containing a fluoro group, such as polytetrafluoroethylene, polyvinylidene fluoride, polyvinyl fluoride, polychlorotrifluoroethylene, tetrafluoroethylene/hexafluoropropylene copolymer, ethylene/tetrafluoroethylene copolymer, ethylene/chlorotrifluoroethylene copolymer, tetrafluoroethylene/perfluoroalkyl vinyl ether copolymer, perfluorocyclo polymer, vinyl ether/fluoroolefin copolymer, vinyl ester/fluoroolefin copolymer, tetrafluoroethylene/vinyl ether copolymer, chlorotrifluoroethylene/vinyl ether copolymer, urethane-crosslinked tetrafluoroethylene, epoxy-crosslinked tetrafluoroethylene, acryl-crosslinked tetrafluoroethylene, and melamine-crosslinked tetrafluoroethylene. In the present invention, the hydrophobicity of the hydrophobic fluororesin may be suitably determined so that the effect of the present invention can be attained. For example, the hydrophobicity is preferably not less than 80°, more preferably 120°, in terms of the contact angle of the fluororesin with water. Among the fluororesins, tetrafluoroethylene is preferred from the viewpoint of high water repellency and persistence of the high water repellency.

Substrates used in the present invention is not particularly limited, and preferred examples thereof include metals, ceramics, glasses, plastics, woods, stones, cements, concretes, fibers, woven fabrics, and combinations of the above materials and laminates of the above materials. The substrate may be determined by taking into consideration applications of the member.

The content of the hydrophobic fluororesin in the surface layer according to the present embodiment may be suitably determined by taking into consideration the composition of the surface layer, applications of the member and the like. However, the content of the hydrophobic fluororesin in the surface layer is preferably about 20 to 60% by weight, more preferably about 25 to 50% by weight.

The content of the photocatalytic oxide in the surface layer is also not particularly limited. For example, the content of the photocatalytic oxide in the surface layer is preferably about 10 to 80% by weight, more preferably about 20 to 50% by weight.

According to a preferred embodiment of the present invention, the thickness of the surface layer may be suitably determined by taking into consideration the composition of the surface layer, applications of the member and the like. For example, when a transparent surface layer is contemplated, the thickness is preferably not more than about 0.4 μm. This can prevent haze development derived from irregular reflection of light, rendering the surface layer substantially transparent. The thickness of the surface layer is more preferably not more than about 0.2 μm from the viewpoint of effectively preventing the color development of the surface layer derived from the interference of light. The smaller the thickness of the surface layer, the better the transparency of the surface layer. However, it is apparent that a given thickness is preferred from the viewpoint of abrasion resistance.

Further, like the embodiment shown in FIG. 1, when the water-repellent fluororesin and the photocatalytic oxide are utilized as a particle, the particle diameter thereof may be suitably determined. For the water-repellent fluororesin, the primary diameter is preferably about 10 nm to 10 μm, more preferably about 100 nm to 1 μm. For the photocatalytic oxide, the crystallite diameter is preferably about 1 to 100 nm, more preferably about 5 to 20 nm.

Not only smoke and soot floating in the air but also water droplets, snow, and, in addition, biopolymers, such as protein, organism, and microorganisms are less likely to be deposited on the member according to the first aspect of the present invention. Therefore, the member according to the present invention can be used in the following applications. Specifically, examples of applications include building materials, exterior of buildings, interior of buildings, sashes, windowpanes, structural members, plates, exterior and coating of vehicles, exterior of machineries and articles, dust-proof covers and coatings, reflector plates for traffic signs, various display devices, advertising towers or poster columns, noise barriers for roads, noise barriers for rail roads, decorative plates for roads, light source covers for signals, display panels for outdoors, bridges, exterior and coating of guard rails, interior and coating of tunnels, lighting apparatuses for interior of tunnels, insulators, covers for solar cells, covers for solar energy collectors of solar water heaters, vinyl plastic hothouses, covers for lighting of vehicles, mirrors for roads, mirrors for vehicles, instrument covers and instrument panels for two-wheeled vehicles, glass lenses, plastic lenses, helmet shields, windowpanes for housings, automobiles and railway vehicles, showcases, showcase for retention of heat, film structures, fins for heat exchangers, glass surfaces for various places, window shades (blinds), tire wheels, roof materials, antennas, power lines, households, stools, bath tubs, wash basins, lighting equipment, covers for lighting, kitchenwares, tablewares, cabinets for tablewares, dishwashers, dishdryers, sinks, cooking ranges, kitchen hoods, ventilation fans, anti-thrombotenic material, anti-protein-depositable materials, bottoms of ships, and films for application on the above articles.

According to a preferred embodiment of the present invention, the proportion of the hydrophobic portion and the hydrophilic portion present on the outermost surface may be suitably determined by taking into consideration the applications of the member.

Specifically, the member, wherein a hydrophobic portion derived from the water-repellent fluororesin and a hydrophilic portion derived from the silicone or silica each are present in at least one place per 10 to 100 $nm^2$ on the outermost surface of the surface layer, has such a property that biopolymers are less likely to be deposited thereon. Therefore, this member can be applied to anti-thrombotenic materials, anti-protein-depositable materials, anti-lipid-adhesion materials and the like. More specifically, the member may be used as contact lenses and disposable medical instruments, such as urinary catheters, percutaneous devices, various artificial organs, blood bags, urine-collecting bags, lung drainages, and tubes for connection between the above members.

On the other hand, the member, wherein a hydrophobic portion derived from the water-repellent fluororesin and a hydrophilic portion derived from the silicone or silica each are present in at least one place per 10 $nm^2$ to 1 $μm^2$ on the outermost surface of the surface layer, has such a property that organisms are less likely to be deposited thereon. Therefore, this member may be used as materials for the bottom of ships, outer wall materials, bathroom materials, bathtub materials, materials for water tanks for the appreciation, and surface materials (for example, design tiles) for equipment utilizing circulating water (for example, artificial waterfalls in parks) in its area which comes into contact with the circulating water.

Further, the member, wherein a hydrophobic portion derived from the water-repellent fluororesin and a hydrophilic portion derived from the silicone or silica each are present in at least one place per 0.1 $mm^2$ on the outermost surface of the surface layer, has such a property that a stain derived from suspended smoke and soot in the air is less likely to be deposited thereon, or the stain, even when once deposited thereon, can be easily removed. Therefore, this member may be used as building materials for outdoors, covers for solar batteries, covers for heat collectors for solar water heaters, handrails, internal walls for tunnels, sound insulating walls, sound barriers, guard fences, road structures, such as decorative plates for roads, window shades (blinds), insulators, wheels, and bodies for vehicles, such as automobiles.

In the member according to the first aspect of the present invention, the contact angle of the surface layer with water is not basically limited so far as the member has an antifouling activity. In general, however, the apparent contact angle of the member with water is about 10 to 120°.

Photocatalytic oxides are known to have antifouling, antimicrobial, and deodorant activities based on the oxidative degradation action. It is believed that, also in the member according to the present invention, this action maintained. It is believed that the oxidative degradation action of the photocatalyst is more preferably exhibited in the case where the hydrophobic portion derived from the water-repellent fluororesin and the hydrophilic portion derived from the silicone or silica each are present in at least one place per 0.1 $mm^2$ on the outermost surface of the surface layer.

Further, the member according to the present invention can effectively prevent the growth of water droplets deposited thereon, and water droplets deposited on the member are rolled over the surface by the action of slight force and easily removed from the surface. Further, ice and snow are not easily deposited on the surface of the member according to the present invention. That is, the member according to the present invention has inhibitory activity against the growth of water droplets, deposition of water droplets, and deposition of ice and snow.

Because the member of the present invention has inhibitory activity against the growth of water droplets, application of the member to glasses, mirrors and the like can effectively prevent the growth of water droplets to such an extent that water droplets scatter light. Specifically, the member can be applied for preventing fogging or ensuring the visibility of glasses, mirrors, lenses, prisms and the like. More specifically, the member can be used as windowpanes for buildings, windowpanes for vehicles, windshields for vehicles, mirrors for vehicles, road mirrors, lavatory mirrors, covers for instrument boards, lenses for spectacles, helmet shields, goggles, and showcases for retention of heat. It is believed that the above action is more preferably exhibited in the case where the hydrophobic portion derived from the water-repellent fluororesin and the hydrophilic portion derived from the silicone or silica each are present in at least one place per 0.2 $μm^2$ on the outermost surface of the surface layer.

Further, since the member according to the present invention has inhibitory activity against the deposition of water droplets and against the deposition of ice and snow, the member according to the present invention can be applied in applications, such as the prevention of a lowering in efficiency of a heat exchanger due to the deposition of water droplets between fins in an aluminum fin of the heat exchanger, the prevention of a lowering in the insulating property of a bath surface due to the deposition of water (salt) onto the surface of an insulator, the prevention of a deterioration in design due to the deposition of water droplets onto an apron portion of a bathtub, the prevention of accumulation of ice and snow on a roof, the prevention of the formation of an icicle, the prevention of accumulation of ice and snow on an antenna, the prevention of communication troubles, the prevention of accumulation of ice and snow on a power line, and the prevention of conical discharge. More specifically, the member can be used as fins for heat exchangers, insulators, bathtubs, counters for lavatories, kitchen counters, roof materials, roof gutters, antennas, and power lines. According to a preferred embodiment of the present invention, it is believed that the inhibitory activity against the deposition of water droplets and the inhibitory activity against the deposition of ice and snow are more preferably exhibited in the case where the hydrophobic portion derived from the water-repellent fluororesin and the hydrophilic portion derived from the silicone or silica each are present in at least one place per mm$^2$ on the outermost surface of the surface layer.

Further, according to a preferred embodiment of the present invention, a metal, such as silver, copper, or zinc, is added to the surface layer. The surface layer with the above metal added thereto can kill bacteria and mold deposited on the surface thereof even in a dark place and hence can further improve the antifouling property.

According to another preferred embodiment of the present invention, a platinum group metal, such as platinum, palladium, ruthenium, rhodium, iridium, or osmium, may be added to the surface layer. The surface layer with the above metal added thereto can enhance the redox activity of the photocatalyst and can improve the degradability of organic stains and the degradability of harmful gases and bad smells.
Production of Antifouling Member According to First Aspect of Invention and Composition Therefor The member according to the first aspect of the present invention may be basically produced by coating a composition for a surface layer on the surface of a substrate and forming the surface layer.

According to a preferred embodiment of the present invention, the composition for the above production comprises:
(a) a silicone resin coating precursor capable of forming a silicone resin coating or a silica coating precursor capable of forming a silica coating;
(b) a photocatalytic oxide dispersed in the coating precursor (a); and
(c) a water-repellent fluororesin dispersed in the coating precursor (a).

In this case, preferred examples of silicone resin coating precursors include siloxanes represented by the average composition formula $$R_pSiX_qO_{(4-p-q)/2}$$

wherein
R is as defined above in connection with the formula (I);
X represents an alkoxy group or a halogen atom; and
p is a number satisfying 0<p<2 and q is a number satisfying 0<q<4.

Another preferred examples of silicone resin coating precursors include hydrolyzable silane derivatives represented by the general formula $$R_pSiX_{4-p}$$

wherein R is as defined above in connection with the formula (I);
X represents an alkoxy group or a halogen atom; and
p is 1 or 2.

Specific examples of preferred hydrolyzable, silane derivatives include methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, phenyltrimethoxysilen, phenyltriethoxysilane, phenyltripropoxysilane, phenyltributoxysilane, dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, phenylmethyldimethoxysilane, phenylmethyldiethoxysilane, phenylmethyldibutoxysilane, n-propyltrimethoxysilane, n-propyltriethoxysilane, n-propyltripropoxysilane, n-propyltributoxysilane, γ-glycosidoxypropyltrimethoxysilane, and γ-acryloxypropyltrimethoxysilane.

The siloxane may be prepared by partial hydrolysis and dehydration polycondensation of the hydrolyzable silane derivative, or by dehydration polycondensation of a partial hydrolyzate of the hydrolyzable silane derivative with a partial hydrolyzate of tetramethoxysilane, tetraethoxysilane, tetrapropoxysilane, tetrabutoxysilane, diethoxydimethoxysilane or the like.

Preferred examples of silica coating precursors include silicates represented by the average composition formula $$SiX_qO_{(4-q)/2}$$

wherein X represents an alkoxy group or a halogen atom and q is a number satisfying 0<q<4.

Another preferred examples of silica coating precursors include tetrafunctional hydrolyzable silane derivatives represented by the general formula $$SiX_4$$

wherein R is as defined above in connection with the formula (I); and
X represents an alkoxy group or a halogen atom.

Specific examples of preferred tetrafunctional hydrolyzable silane derivatives include tetramethoxysilane, tetraethoxysilane, tetrapropoxysilane, tetrabutoxysilane, and diethoxydimethoxysilane.

Specific examples of preferred silicates include partial hydrolyzates and dehydration polycondensates of the above tetrafunctional hydrolyzable silane derivatives.

The composition for the surface layer is preferably a solution or dispersion of the above components (a), (b), and (c) in a solvent. Preferred solvents include water, ethanol, and propanol.

The composition for the surface layer may further contain additives. Examples of additives usable herein include: catalysts for accelerating the hydrolysis of the silicone precursor, for example, hydrochloric acid, nitric acid, acetic acid, and maleic acid; catalysts for curing the silicone precursor, for example, basic compounds, such as tributylamine and hexylamine, and acidic compounds, such as aluminum triisopropoxide and tetraisopropyl titanate; surfactants for improving the dispersibility of a coating liquid, such as silane coupling agents; levelling agents, such as diacetone alcohol and cellosolve; and spraying agents, such as dimethyl ether.

The member according to the first aspect of the present invention using this composition may be produced by coating the above composition on a substrate and subjecting the coated substrate to such a reaction that the silicone resin coating precursor or silica coating precursor in the composition is converted to a silicone coating or a silica coating.

Suitable coating methods usable for coating the composition onto the substrate include spray coating, dip coating, flow coating, spin coating, roll coating, brush coating, and sponge coating. The reaction by which the silicone resin coating precursor or the silica coating precursor is converted to the silicone coating or the silica coating may be suitably determined by taking into consideration properties of the precursor utilized. For example, the precursor may be polymerized by heat treatment, standing at room temperature, ultraviolet irradiation, wetting treatment or the like. The above method according to the present invention is advantageous in that selection of this reaction realizes the production of the member under relatively mild reaction conditions. More specifically, the production can be carried out, for example, by simply allowing the coated substrate to stand at room temperature. Further, also in the case of ultraviolet irradiation, the production can be carried out substantially at room temperature.

Further, according to the present invention, provision of the above composition has lead to provision of a method for imparting an antifouling property to a desired surface, the method comprising the steps of: coating the above composition onto a surface to which an antifouling property is to be imparted; and subjecting the coating to such a reaction that the silicone resin coating precursor or the silica coating precursor in the composition is converted to a silicone coating or a silica coating.

Antifouling Member According to Second Embodiment of Present Invention

The member according to the second aspect of the present invention comprises a substrate and a surface layer provided on the substrate, the surface layer comprising a hydrophobic resin and a photocatalytic oxide. The hydrophobic resin and the photocatalytic oxide are present in a microscopically dispersed and exposed state on the outermost surface of the surface layer.

As with the member according to the first aspect of the present invention, the member according to the second aspect of the present invention has, on its outermost surface, a hydrophobic portion, and a hydrophilic portion induced by a photocatalyst. As a result, both hydrophilic deposits and hydrophobic deposits cannot be deposited on the surface of the member, and, even when deposited on the surface of the member, are unstable and hence are easily removed, permitting the surface of the member to be kept clean. Therefore, the member according to the second aspect of the present invention also may be basically used in the same applications as the member according to the first aspect of the present invention.

According to a preferred embodiment of the present invention, the surface layer of the member of the present invention further comprises an inorganic oxide. This inorganic oxide, together with the hydrophobic resin and the photocatalytic oxide, is present in a microscopically dispersed and exposed state on the outermost surface of the surface layer. Further, the inorganic oxide is hydrophilified by photocatalytic action created in response to photoexcitation of the photocatalytic oxide. This means that the hydrophilic portion induced by the photocatalyst is further provided in the surface layer by the inorganic oxide.

Figure 3:
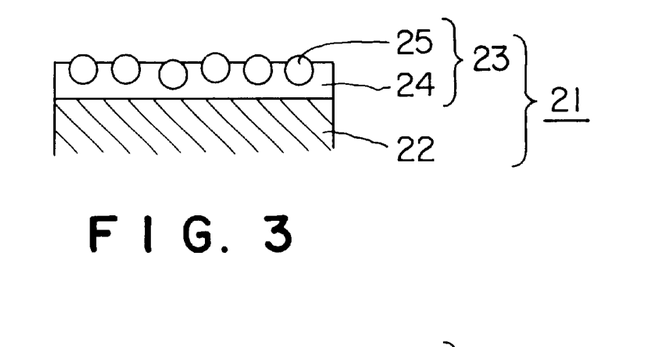
FIG. 3 is a diagram showing the structure of a member according to the second aspect of the present invention. A member 21 according to the present invention comprises a surface layer 23 provided on a substrate 22. The surface layer 23 comprises a hydrophobic resin layer 24 and a photocatalytic oxide 25 dispersed in the layer 24, the photocatalytic oxide 25 being present in an exposed state on the outermost surface of the layer 24.

A first preferred embodiment of the second aspect of the present invention is shown in FIG. 3. The member 21 shown in this drawing comprises a surface layer 23 provided on a substrate 22. The surface layer 23 comprises a hydrophobic resin layer 24 and a photocatalytic oxide 25 dispersed in this layer 24. The photocatalytic oxide 25 is present in an exposed state on the outermost surface of the layer 24. In the embodiment shown in this drawing, the photocatalytic oxide is provided as a particle.

Figure 4:
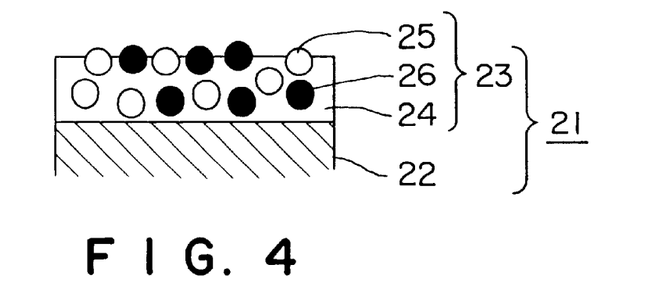
FIG. 4 is a diagram of a member having the same construction as the member according to the aspect shown in FIG. 3, except that the surface layer 23 further comprises an inorganic oxide 26.

In the embodiment shown in FIG. 3, the surface layer 23 may contain an inorganic oxide, and this embodiment is shown in FIG. 4. The embodiment shown in FIG. 4, a particulate inorganic oxide 26, together with the photocatalytic oxide 25, is dispersed in the hydrophobic resin layer 24. The inorganic oxide 26 also is present in an exposed state on the outermost surface of the layer 23.

Figure 5:
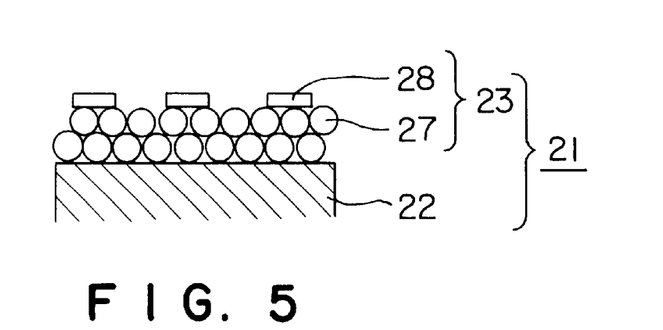

A second preferred embodiment of the second aspect of the present invention is as shown in FIG. 5. The member 21 shown in this drawing comprises a layer 24, formed of a photocatalytic oxide, and a layer 28, formed of a hydrophobic resin, provided on the layer 24. In this case, the layer 28 formed of a hydrophobic resin is laminated onto a part of the layer 24. Consequently, the hydrophobic resin and the photocatalytic oxide are present in a microscopically dispersed and exposed state on the outermost surface of the surface layer 23.

Figure 6:
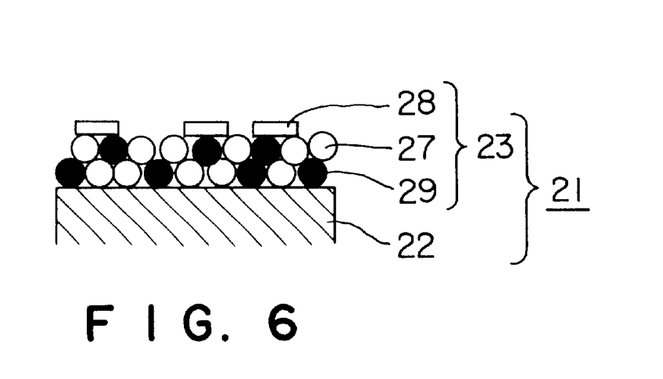
FIG. 6 is a diagram of a member having the same construction as the member according to the embodiment shown in FIG. 5, except that the layer 24 comprising a photocatalytic oxide further comprises an inorganic oxide 29.

Further, in the embodiment shown in FIG. 5, the layer 24 formed of a photocatalytic oxide may further contain an inorganic oxide. This embodiment is shown in FIG. 6. In the embodiment shown in FIG. 6, a particulate inorganic oxide 29 is dispersed in the layer formed of a photocatalytic inorganic oxide. This inorganic oxide 29 also is present in an exposed state on the outermost surface of the layer 23.

In the second aspect of the present invention, photocatalytic oxides include those as described above. Further, light sources and irradiation intensity of light may be substantially the same as those described above in connection with the first aspect of the present invention.

In the second aspect of the present invention, hydrophobic resins include fluororesins, acrylic resins, urethane resins, polyester resins, vinyl resins, PET, and silicone resins, for example, acrylic silicone, and rubbers.

According to a preferred embodiment of the present invention, a fluororesin is utilized as the hydrophobic resin from the viewpoint of lightfastness. Preferred fluororesins include polymers containing a fluoro group, such as polytetrafluoroethylene, polyvinylidene fluoride, polyvinyl fluoride, polychlorotrifluoroethylene, tetrafluoroethylene/hexafluoropropylene copolymer, ethylene/tetrafluoroethylene copolymer, ethylene/chlorotrifluoroethylene copolymer, tetrafluoroethylene/perfluoroalkyl vinyl ether copolymer, perfluorocyclo polymer, vinyl ether/fluoroolefin copolymer, vinyl ester/fluoroolefin copolymer, tetrafluoroethylene/vinyl ether copolymer, chlorotrifluoroethylene/vinyl ether copolymer, urethane-crosslinked tetrafluoroethylene, epoxy-crosslinked tetrafluoroethylene, acryl-crosslinked tetrafluoroethylene, and melamine-crosslinked tetrafluoroethylene.

According to another preferred embodiment of the present invention, a silicone resin is used as the hydrophobic resin. Specific examples of preferred silicone resins include hydrolyzates and hydration polycondensates of methyltrimethoxysilane, methyltriethoxysilane, methyltrichlorosilane, methyltribromosilane, methyltriisopropoxysilane, methyl-tri-t-butoxysilane, ethyltrimethoxysilane, ethyltriethoxysilane, ethyltrichlorosilane, ethyltribromosilane, ethyltriisopropoxysilane, ethyl-tri-t-butoxysilane, n-propyltrimethoxysilane, n-propyltriethoxysilane, n-propyltrichlorosilane, n-propyltribromosilane, n-propyltriisopropoxysilane, n-propyl-tri-t-butoxysilane, n-hexyltrimethoxysilane, n-hexyltriethoxysilane, n-hexytrichlorosilane, n-hexyltribromosilane, n-hexyltriisopropoxysilane, n-hexyl-tri-t-butoxysilane, n-decyltrimethoxysilane, n-decyltriethoxysilane, n-decyltrichlorosilane, n-decyltribromosilane, n-decyltriisopropoxysilane, n-decyl-tri-t-butoxysilane, n-octatrimethoxysilane, n-octatriethoxysilane, n-octatrichlorosilane, n-octatribromosilane, n-octatriisopropoxysilane, n-octa-tri-t-butoxysilane, phenyltrimethoxysilane, phenyltriethoxysilane, phenyltrichlorosilane, phenyltribromosilane, phenyltriisopropoxysilane, phenyl-t-butoxysilane, dimethyldichlorosilane, dimethyldibromosilane, dimethyldimethoxysilane, dimethyldiethoxysilane, diphenyldichlorosilane, diphenyldibromosilane, diphenyldimethoxysilane, diphenyldiethoxysilane, phenylmethyldichlorosilane, phenylmethyldibromosilane, phenylmethyldimethoxysilane, phenylmethyldiethoxysilane, vinyltrichlorosilane, vinyltribromosilane, vinyltrimethoxysilane, vinyltriethoxysilane, vinyltriisopropoxysilane, vinyl-tri-t-butoxysilane, trifluoropropyltrichlorosilane, trifluoropropyltribromosilane, trifluoropropyltrimethoxysilane, trifluoropropyltriethoxysilane, trifluoropropyltriisopropoxysilane, trifluoropropyl-tri-t-butoxysilane, γ-glycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyl-tri-t-butoxysilane, γ-methacryloxypropylmethyldimethoxysilane, γ-methacryloxypropylmethyldiethoxysilane, γ-methacryloxypropyltrimethoxysilane, γ-methacryloxypropyltriethoxysilane, γ-methacryloxypropyltriisopropoxysilane, γ-methacryloxypropyl-tri-t-butoxysilane, γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminopropyl-tri-t-butoxysilane, γ-mercaptopropylmethyldimethoxysilane, γ-mercaptopropylmethyldiethoxysilane, γ-mercaptopropyltrimethoxysilane, γ-mercaptopropyltriethoxysilane, γ-mercaptopropyltriisopropoxysilane, γ-mercaptopropyl-tri-t-butoxysilane, β-(3,4-epoxycyclohexyl) ethyltrimethoxysilane, and β-(3,4-epoxycyclohexyl) ethyltriethoxysilane. In the first aspect of the present invention, these silicone resins are used as a material for imparting a hydrophilic portion. Specifically, in the first aspect of the present invention, these silicone resins are hydrophilified by photocatalytic action of the photocatalytic oxide. It is considered that, also in the second aspect of the present invention, the silicone resin present around the photocatalytic oxide is hydrophilified. In the second aspect of the present invention, however, the silicone resin, as compared with the photocatalytic oxide, is present in an amount large enough to serve substantially as a hydrophobic resin. Therefore, there is no discrepancy between the first and second aspects of the present invention.

In the present invention, the level of the hydrophobicity of the hydrophobic resin may be suitably determined so far as the effect of the present invention is attained. For example, the level of the hydrophobicity is preferably not less than 60°, more preferably not less than 120°, in terms of the contact angle of the hydrophobic resin with water.

Inorganic oxides, which are preferably added in the second aspect of the present invention, are not particularly limited so far as they can be hydrophilified by photocatalytic action of the photocatalytic oxide. Examples thereof include silica, alumina, water glass, silicate, aluminosilicate, zirconia, ceria, tin oxide, calcia, magnesia, amorphous titania and other metal oxides. Among them, silica or alumina is particularly preferred from the viewpoint of retention of the hydrophilicity of the hydrophilic portion in a dark place.

The substrate also is not particularly limited. As with the substrate used in the first aspect of the present invention, the substrate may be suitably determined by taking the applications of the member into consideration. Specific examples of substrates usable herein include those described above in connection with the first aspect of the present invention.

The content of the photocatalytic oxide in the surface layer of the member according to the second aspect of the present invention is not particularly limited. For example, the content of the photocatalytic oxide in the surface layer is preferably about 10 to 80% by weight, more preferably about 20 to 50% by weight.

According to a preferred embodiment of the present invention, the thickness of the surface layer may be suitably determined by taking into consideration the composition of the surface layer, applications of the member and the like. The preferred range of the layer thickness may also be the same as that described above in connection with the first aspect of the present invention.

Like the embodiment shown in the drawing, the photocatalytic oxide may be utilized as a particle. Although the particle diameter (crystallite diameter) may be suitably determined, the particle diameter is preferably about 1 to 100 nm, more preferably about 5 to 20 nm.

Also when the inorganic oxide is used as a particle, the particle diameter thereof may be suitably determined. However, the particle diameter is preferably about 1 nm to 1 μm, more preferably about 5 to 100 nm.

For the embodiments shown in the drawings, preferred conditions are as follows.

At the outset, in the embodiment shown in FIG. 3, the thickness of the hydrophobic resin layer 24 is preferably about 10 nm to 10 μm, more preferably about 100 nm to 1 μm. The content of the photocatalytic oxide particle in the layer 24 is preferably about 10 to 80% by weight, more preferably about 20 to 50% by weight. In the embodiment shown in FIG. 4, the content of the photocatalytic oxide particle is preferably about 1 to 80% by weight, more preferably about 20 to 50% by weight, while the content of the inorganic oxide particle is preferably about 1 to 70% by weight, more preferably about 5 to 55% by weight.

Further, in the embodiment shown in FIG. 5, the thickness of the photocatalytic oxide layer 27 is preferably about 10 nm to 1 μm, more preferably about 50 to 400 nm. The thickness of the hydrophobic resin layer overlying the photocatalytic oxide layer 27 is preferably about 1 to 100 nm, more preferably about 5 to 50 nm. In the embodiment shown in FIG. 6, the content of the photocatalytic oxide particle is preferably about 10 to 99% by weight, more preferably about 50 to 99% by weight, while the content of the inorganic oxide particle is preferably about 50 to 90% by weight, more preferably about 5 to 50% by weight.

As described above, basically, the member according to the second aspect of the present invention also may be used in the same applications as the member according to the first aspect of the present invention. Further, as with the first aspect of the present invention, in the second aspect of the present invention, the proportion of the hydrophobic portion and the hydrophilic portion present on the surface layer also may be suitably determined by taking applications of the member into consideration. The proportion of the hydrophobic portion and the hydrophilic portion and specific examples of applications of the member may be the same as those described above in connection with the first aspect of the present invention.

Specifically, the member, wherein the hydrophobic portion and the hydrophilic portion each are present in at least one place per 10 to 100 $nm^2$ on the outermost surface of the surface layer, has such a property that biopolymers are less likely to be deposited thereon. Therefore, this member can be applied to anti-thrombotenic materials, anti-protein-depositable materials, anti-lipid-adhesion materials and the like. More specifically, the member may be used as contact lenses and disposable medical instruments, such as urinary catheters, percutaneous devices, various artificial organs, blood bags, urine-collecting bags, lung drainages, and tubes for connection between the above members.

On the other hand, the member, wherein the hydrophobic portion and the hydrophilic portion each are present in at least one place per 10 $nm^2$ to 1 $\mu m^2$ on the outermost surface of the surface layer, has such a property that organisms are less likely to be deposited thereon. Therefore, this member may be used as materials for the bottom of ships, outer wall materials, bathroom materials, bathtub materials, materials for water tanks for the appreciation, and surface materials (for example, design tiles) for equipment utilizing circulating water (for example, artificial waterfalls in parks) in its area which comes into contact with the circulating water.

Further, the member, wherein the hydrophobic portion and the hydrophilic portion each are present in at least one place per $mm^2$ on the outermost surface of the surface layer, has such a property that a stain derived from suspended smoke and soot in the air is less likely to be deposited thereon, or the stain, even when once deposited thereon, can be easily removed. Therefore, this member may be used as building materials for outdoors, covers for solar batteries, covers for heat collectors for solar water heaters, handrails, internal walls for tunnels, sound insulating walls, sound barriers, guard fences, road structures, such as decorative plates for roads, window shades (blinds), insulators, wheels, and bodies for vehicles, such as automobiles.

In the member according to the second aspect of the present invention, as with the member according to the first aspect of the present invention, the contact angle of the surface layer with water is not basically limited so far as the member has an antifouling activity. In general, however, the apparent contact angle of the member with water is about 10 to 120°.

Photocatalytic oxides are known to have antifouling, antimicrobial, and deodorant activities based on the oxidative degradation action. It is believed that, also in the member according to the present invention, this action is maintained. It is believed that the oxidative degradation action of the photocatalyst is more preferably exhibited in the case where the hydrophobic portion derived from the water-repellent fluororesin and the hydrophilic portion derived from the silicone or silica each are present in at least one place per 0.1 $mm^2$ on the outermost surface of the surface layer.

Further, the member according to the present invention can effectively prevent the growth of water droplets deposited thereon, and water droplets deposited on the member are rolled over the surface by the action of slight force and easily removed from the surface. Further, ice and snow are not easily deposited on the surface of the member according to the present invention. That is, the member according to the present invention has inhibitory activity against the growth of water droplets, deposition of water droplets, and deposition of ice and snow.

Because the member of the present invention has inhibitory activity against the growth of water droplets, application of the member to glasses, mirrors and the like can effectively prevent the growth of water droplets to such an extent that water droplets scatter light. More specifically, the member can be applied for preventing fogging or ensuring the visibility of glasses, mirrors, lenses, prisms and the like. More specifically, the member can be used as windowpanes for buildings, windowpanes for vehicles, windshields for vehicles, mirrors for vehicles, road mirrors, lavatory mirrors, covers for instrument boards, lenses for spectacles, helmet shields, goggles, and showcases for retention of heat. It is believed that the above action is more preferably exhibited in the case where the hydrophobic portion derived from the water-repellent fluororesin and the hydrophilic portion derived from the silicone or silica each are present in at least one place per 0.2 $\mu m^2$ on the outermost surface of the surface layer.

Further, since the member according to the present invention has inhibitory activity against the deposition of water droplets and against the deposition of ice and snow, the member according to the present invention can be used in applications, such as the prevention of a lowering in efficiency of a heat exchanger due to the deposition of water droplets between fins in an aluminum fin of the heat exchanger, the prevention of a lowering in the insulating property of a bath surface due to the deposition of water (salt) onto the surface of an insulator, the prevention of a deterioration in design due to the deposition of water droplets onto an apron portion of a bathtub, the prevention of accumulation of ice and snow on a roof, the prevention of the formation of an icicle, the prevention of accumulation of ice and snow on an antenna, the prevention of communication troubles, the prevention of accumulation of ice and snow on a power line, and the prevention of conical discharge. More specifically, the member can be used as fins for heat exchangers, insulators, bathtubs, counters for lavatories, kitchen counters, roof materials, roof gutters, antennas, and power lines. According to a preferred embodiment of the present invention, it is believed that the inhibitory activity against the deposition of water droplets and the inhibitory activity against the deposition of ice and snow are more preferably exhibited in the case where the hydrophobic portion derived from the water-repellent fluororesin and the hydrophilic portion derived from the silicone or silica each are present in at least one place per $mm^2$ on the outermost surface of the surface layer.

Further, according to the second aspect of the present invention, as with the first aspect of the present invention, preferably, a metal, such as silver, copper, or zinc, is added to the surface layer. The surface layer with the above metal added thereto can kill bacteria and mold deposited on the surface thereof even in a dark place and hence can further improve the antifouling property. Further, a platinum group metal, such as platinum, palladium, ruthenium, rhodium, iridium, or osmium, may be added to the surface layer. The surface layer with the above metal added thereto can enhance the redox activity of the photocatalyst and can improve the degradability of organic stains and the degradability of harmful gases and bad smells.

Production of Antifouling Member According to Second Aspect

Preferably, the member according to the second aspect of the present invention is produced as follows.

The member having a construction shown in FIG. 3 or 4 may be produced by coating a substrate with a layer comprising a hydrophobic resin containing a photocatalytic oxide and optionally an inorganic oxide dispersed therein. More specifically, a hydrophobic resin is dissolved in a solvent capable of dissolving the hydrophobic resin, and a photocatalytic oxide and optionally an inorganic oxide are dispersed in the solution to prepare a coating liquid which is then coated on a substrate. Thereafter, the solvent is removed by evaporation to dry the coating and to form a resin layer. Thus, a surface layer is formed on the-substrate.

Basically, the photocatalytic oxide and the inorganic oxide are present in an exposed state on the outermost surface of the surface layer, the degree of the exposure of the photocatalytic oxide and the inorganic oxide on the outermost surface of the surface layer being basically proportional to the concentration of the photocatalytic oxide and the inorganic oxide in the coating liquid. In some cases, however, even when the concentration of these materials in the coating liquid is increased, it is difficult to expose the photocatalytic oxide and the inorganic oxide on the outermost surface. In this case, after the formation of the resin layer, the surface of the resin layer may be removed to expose a desired amount of the photocatalytic oxide and the inorganic oxide, present within the layer, on the surface thereof.

Alternatively, the members having constructions as shown in FIGS. 3 and 4 may be produced as follows. Specifically, at the outset, a hydrophobic resin precursor composition capable of forming a hydrophobic resin layer is coated on a substrate. An example of the precursor composition is a solution of a hydrophobic resin in a solvent capable of dissolving the hydrophobic resin. On the other hand, the surface of the inorganic oxide and the surface of the photocatalytic oxide are hydrophobified with a hydrophobifying agent. Specific examples of hydrophobifying agents include, for example, silane coupling agents. The hydrophobified photocatalytic oxide and inorganic oxide are coated on the coating of the hydrophobic resin precursor composition formed on the substrate. The surface of the photocatalytic oxide and the surface of the inorganic oxide are now in a hydrophobified state, and, hence, the photocatalytic oxide and the inorganic oxide have good affinity for and can be evenly present on the hydrophobic resin coating. Thereafter, the hydrophobifying agent is removed from the surface of the photocatalytic oxide and the inorganic oxide. The hydrophobifying agent may be removed by a suitable method determined depending upon the type of the hydrophobifying agent. For example, a silane coupling agent can be easily removed by ultraviolet irradiation or etching. The assembly is then cured or dried to induce such a reaction that the precursor composition is converted to a hydrophobic resin layer. Thus, members as shown in the drawings are obtained.

The members having constructions as shown in FIGS. 5 and 6 may be produced, for example, by forming a layer comprising a photocatalytic oxide and optionally an inorganic oxide on the surface of a substrate, applying a hydrophobic resin precursor composition, capable of forming a hydrophobic resin layer, on a part of the above layer to form a coating, and subjecting the coating to such a reaction that the coating is converted to a hydrophobic resin layer. More specifically, a composition containing photocatalytic oxide particles and optionally a binder is provided. The composition is coated on a substrate. The coating is subjected to such a reaction that photocatalytic oxide particles are bonded to one another through the binder, thereby forming a photocatalytic oxide layer. A solution containing a hydrophobic resin precursor composition dissolved therein is then applied on a part of the photocatalytic oxide layer. The application of the solution on a part of the photocatalytic oxide layer may be carried out, for example, by applying the precursor composition through a slit having a specific opening pattern. Thereafter, the coating is then subjected to such a reaction that the precursor composition is converted to a hydrophobic resin layer, thereby forming a member.

Alternatively, members having constructions as shown in FIGS. 5 and 6 may be produced as follows. Specifically, at the outset, a layer comprising a photocatalytic oxide and optionally an inorganic oxide is formed on the surface of a substrate in the same manner as described above. A composition comprising a photodecomposable hydrophobic material and a hydrophobic resin is applied on the above layer to form a coating. The coating is then irradiated with light to decompose and remove the photodecomposable hydrophobic material, and the coating is subjected to such a reaction that the coating is converted to a hydrophobic resin layer.

Further, members having constructions as shown in FIGS. 5 and 6 may be produced as follows. Specifically, at the outset, a layer comprising a photocatalytic oxide and optionally an inorganic oxide is formed on the surface of a substrate in the same manner as described above. A composition comprising a hydrophobic material, dissolvable in a specific solvent, and a hydrophobic resin is applied onto the above layer to form a coating. The specific solvent is brought into contact with the surface of the coating to remove the hydrophobic material, thereby converting the coating layer to a hydrophobic layer to prepare a member. Hydrophobic materials dissolvable in specific solvents are known in the art. Examples of combinations of hydrophobic materials with specific solvents capable of dissolving them include: a combination of polyethylene or polystyrene with a petroleum; a combination of polyacetal or polyamide with a strong alkali; a combination of polyacetal, ABS, or acryl with a strong acid; a combination of low-density polyethylene, polyphenyl oxide, polystyrene, polysulfone, or polyvinyl chloride with a chloro compound solvent; a combination of polyacetal, ABS, polystyrene, or polyvinyl chloride with an amine compound; a combination or acryl, polystyrene, polysulfone, or polyvinyl chloride with a ketone, an ester, an ether; and a combination of ABS, acryl, polyphenylene oxide, polystyrene, or polyvinyl chloride with an aromatic acid compound solvent.

EXAMPLES

Example 1

A titanium oxide (anatase form) sol (Nissan Chemical Industries Ltd., TA-15, nitric acid peptization type, pH=1), a silica sol (Japan Synthetic Rubber Co., Ltd., liquid A of Glasca, pH=4), methyltrimethoxysilane (Japan Synthetic Rubber Co., Ltd., liquid B of Glasca), and ethanol were mixed together. The mixture was stirred for 2 to 3 min to prepare a coating liquid. The coating liquid was spray-coated on the surface of a glazed tile having a size of 5×10 cm square (TOTO, LTD., AB02E11). The coating was heat treated for 15 min at 200° C. to form a surface layer comprising 11 parts by weight, based on charge weight, of titanium oxide (anatase form) particles, 6 parts by weight, based on charge weight, of silica, and 5 parts by weight, based on charge weight, of silicone. Thus, a member having antifouling activity was prepared. This member was used as sample 1.

The contact angle of sample 1 with water was 85°. In this case, the contact angle of the sample with water was measured with a contact angle goniometer (Kyowa Interface Science Co., Ltd., CA-X150). The contact angle was measured 30 sec after dropping of a water droplet through a microsyringe on the surface of the sample.

The surface of sample 1 was then irradiated with ultraviolet light from an ultraviolet light source (Sankyo Denki, a black light blue (BLB) fluorescent lamp) at an ultraviolet irradiation intensity of 0.3 mW/cm$^2$ for one day. The member thus prepared was used as sample 2. The contact angle of sample 2 with water was measured. As a result, it was found that the sample was hydrophilified to 0° in terms of the contact angle.

Next, the surface of sample 1 was analyzed by Raman spectroscopy. Further, sample 1 was irradiated with ultraviolet light from a mercury lamp for 2 hr at an ultraviolet irradiation intensity of 22.8 mW/cm$^2$ to prepare sample 3. The surface of sample 3 was analyzed by Raman spectroscopy. As a result, a peak derived from a methyl group observed on the surface of sample 1 was not observed in sample 3. Instead, a broad peak derived from a hydroxyl group was observed in sample 3.

From the above fact, it is considered that, due to photocatalytic action created in response of photoexcitation of the titanium oxide (anatase form) as the photocatalyst, organic groups bonded to silicon atoms in a silicone molecule on the surface of the coating are substituted by hydroxyl groups and the coating is hydrophilified.

Example 2

A titanium oxide (anatase form) sol (Nissan Chemical Industries Ltd., TA-15), a silica sol (Japan Synthetic Rubber Co., Ltd., liquid A of Glasca), methyltrimethoxysilane (Japan Synthetic Rubber Co., Ltd., liquid B of Glasca), polytetrafluoroethylene (PTFE) particles (Daikin Industries, Ltd., Ruburon L-5), and ethanol were mixed together. The mixture was stirred for 2 to 3 min to prepare a coating liquid. The coating liquid was spray-coated (spray diameter: 0.5 mm) on the surface of a glazed tile substrate having a size of 5×10 cm square (TOTO, LTD., AB02E11). The coating was heat treated for 15 min at 200° C. to form a surface layer comprising 33 parts by weight, based on charge weight, of titanium oxide (anatase form) particles, 66 parts by weight, based on charge weight, of polytetrafluoroethylene, 6 parts by weight, based on charge weight, of silica, and 5 parts by weight, based on charge weight, of silicone. The member thus formed was used as sample 4. The contact angle of sample 4 with water was 110°.

The surface of sample 4 was then irradiated with ultraviolet light from an ultraviolet light source (Sankyo Denki, a black light blue (BLB) fluorescent lamp) at an ultraviolet irradiation intensity of 0.3 mW/cm$^2$ for one day. The member thus prepared was used as sample 5. The contact angle of sample 5 with water was 97.4°, that is, was somewhat lower than that before the ultraviolet light irradiation. It is expected that photocatalytic action permits organic groups bonded to silicon atoms in a silicone molecule were substituted by hydroxyl groups, resulting in hydrophilification. Therefore, it is considered that the contact angle of the sample with water was somewhat lowered by the hydrophilification. That is, it is considered that, due to the photocatalytic action, organic groups on the surface of sample 5 was substituted by hydroxyl groups, resulting in the formation of a structure wherein both a hydrophilic portion, where a hydrophilified silicone was exposed to the outside air, and a water-repellent portion, where a water-repellent fluororesin was exposed to the outside air, were microscopically dispersed.

Example 3

Sample 5 prepared in Example 2 was disposed outdoors to determine the capability of the surface of the sample to retain the cleanness against deposits and contaminants. For comparison, a glazed tile plate was disposed outdoors in the same manner as the sample 5.

Figure 2:
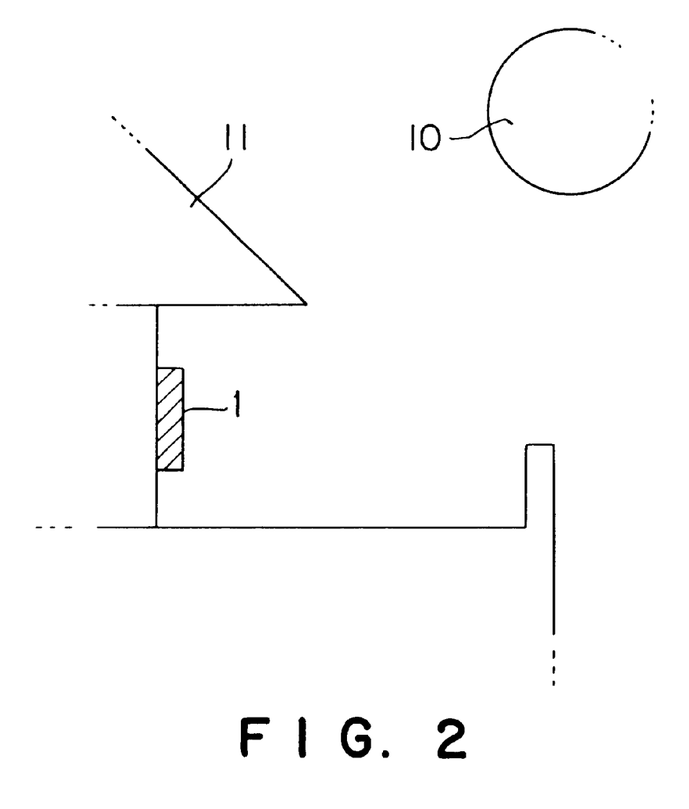
FIG. 2 is a diagram illustrating how to install a test sample in Example 3. In the drawing, the member 1 according to the present invention is installed on the wall surface of a house 11 so as to be exposed to sunlight from the sun 10.

The capability of the surface of the sample to retain the cleanness against deposits and contaminants was determined by disposing the sample under a roofed portion in the rooftop of a building as shown in FIG. 2 and exposing the sample for four months.

As a result, the glazed title plate was found to be somewhat soiled, whereas no soil was found for sample 5.

Before and after the 4-month outdoor exposure test, the color difference was measured for the surface of the member. The color difference was measured with a color difference meter (Tokyo Denshoku Co., Ltd.). ΔE* was used as the color difference according to the Japanese Industrial Standards (JIS) H0201. As a result, the change in color difference between before and after the outdoor exposure test was 2 for the glazed tile plate, whereas the change in color difference was as small as 0.5 for sample 5.

Example 4

Photocatalytic titania particles (Ishihara Sangyo Kaisha Ltd., ST-41, 5 g), the surface of which had been coated with 1,3,5,7-tetramethylcyclotetrasiloxane by bringing 1,3,5,7-tetramethylcyclotetrasiloxane into contact in a gaseous phase with the photocatalytic titania particles, Voncoat (Dainippon Ink and Chemicals, Inc., vinyl acetate/acryl copolymer, 0.6 g), and 25 ml of water were mixed together in a paint shaker. The mixture was coated on an aluminum substrate. In this case, the proportion of the resin component to the titania was 1 in terms of the volume ratio. The coating was cured at 120° C. to prepare sample 19.

The contact angle of sample 19 with water was measured and found to be 70°.

Further, the surface of the sample was treated with an aqueous sodium hydroxide solution having pH 10, further treated with dilute hydrochloric acid, and then irradiated with sunlight to prepare sample 20.

The contact angle of sample 20 with water was measured. As a result, it was found that the contact angle as reduced to 56°.

The surface of sample 20 was coated with an aqueous Methylene Blue solution, and the coated sample was irradiated with sunlight in the same manner as described above. One day after the initiation of the irradiation, it was found that the dye was faded, confirming that antifouling effect by the photocatalytic decomposition could be attained.

Example 5

A titanium oxide (anatase form) sol (Ishihara Sangyo Kaisha Ltd., STS-11), polytetrafluoroethylene (PTFE) particles (Daikin Industries, Ltd., D-1), and distilled water were mixed together. The mixture was stirred for 30 mmin to prepare a coating liquid. The coating liquid was coated on a soda lime glass substrate having a size of 10 cm square by spray coating. The coating was heat-treated at 380° C. for 3 min, thereby forming a surface layer comprising 4 parts by weight of titanium oxide (anatase form) particles and 6 parts by weight of polytetrafluoroethylene particles. Next, a reflective coating of aluminum was formed by vacuum deposition on the backside of the glass plate to prepare mirror sample 11.

Observation of the surface of sample 11 showed that this sample had a surface layer having such a structure that both a hydrophilic portion, where photocatalytic oxide particles were exposed so as to contact with the outside air, and a water-repellent portion, where a water-repellent fluororesin were exposed to so as to contact with the outside air, were microscopically dispersed on the surface thereof.

The contact angle of the surface of sample 11 with water was measured. In this case, the contact angle of the sample with water was measured with a contact angle goniometer (Kyowa Interface Science Co., Ltd., CA-X150). The contact angle was measured 30 sec after dropping of a water droplet on the surface of the sample. As a result, the contact angle of the sample with water was 120°, that is, a value more than 90°. When sample 11 was inclined, water droplets were rolled down.

The surface of sample 11 was then irradiated with ultraviolet light from an ultraviolet light source (Sankyo Denki, a black light blue (BLB) fluorescent lamp) at an irradiation intensity of 0.5 mW/cm$^2$ for about one day to prepare sample 12. The contact angle of sample 12 with water was measured and found to be 110°. When sample 12 was inclined, water droplets were rolled down.

Example 6

A titanium oxide (anatase form) sol (Ishihara Sangyo Kaisha Ltd., STS-11), polytetrafluoroethylene (PTFE) particles (Daikin Industries, Ltd., D-1), and distilled water were mixed together. The mixture was stirred for 30 min to prepare a coating liquid. The coating liquid was coated on a slate substrate by spray coating. The coating was heat-treated at 380° C. for 3 min, thereby forming a surface layer comprising 4 parts by weight of titanium oxide (anatase form) particles and 6 parts by weight of polytetrafluoroethylene particles. Thus, sample 21 was obtained.

Observation of the surface of sample 21 showed that this sample had a surface layer having such a structure that both a hydrophilic portion, where photocatalytic oxide particles were exposed so as to contact with the outside air, and a water-repellent portion, where a water-repellent fluororesin were exposed to so as to contact with the outside air, were microscopically dispersed on the surface thereof.

The contact angle of the surface of sample 21 with water was then measured. In this case, the contact angle of the sample with water was measured with a contact angle goniometer (Kyowa Interface Science Co., Ltd., CA-X150). The contact angle was measured 30 sec after dropping of a water droplet on the surface of the sample. As a result, the contact angle of the sample with water was 120°, that is, a value more than 90°. When sample 21 was inclined, water droplets were rolled down.

The surface of sample 21 was then irradiated with ultraviolet light from an ultraviolet light source (Sankyo Denki, a black light blue (BLB) fluorescent lamp) at an ultraviolet irradiation intensity of 0.5 mW/cm$^2$ for about one day to prepare sample 22. The contact angle of sample 22 with water was measured and found to be 110°. When sample 22 was inclined, water droplets were rolled down.

What is claimed is:

1. A member comprising: a substrate, and a surface layer provided on the substrate, wherein the surface layer comprises a hydrophobic resin and a photocatalytic oxide,
   the hydrophobic resin and the photocatalytic oxide being present in a microscopically dispersed and exposed state on the outermost surface of the surface layer,
   the photocatalytic oxide being hydrophilifiable in response to photoexcitation, and
   the presence of a hydrophobic portion derived from the hydrophobic resin exposed on the outermost surface, and a hydrophilic portion derived from the photocatalytic oxide exposed on the outermost surface, preventing hydrophilic materials and hydrophobic materials from being deposited on the surface of the member, thus permitting the surface of the member to be kept clean.

2. The member according to claim 1, wherein the surface layer further comprises an inorganic oxide which, together with the hydrophobic resin and the photocatalytic oxide, is microscopically dispersed and exposed on the outermost surface of the surface layer, the photocatalytic oxide functioning to hydrophilify the inorganic oxide by photocatalytic action in response to photoexcitation.

3. The member according to claim 1, wherein the surface layer further comprises silver, copper, or zinc.

4. A member comprising a substrate, and a surface layer provided on the substrate, wherein the surface layer comprises a first layer formed of a photocatalytic oxide on the substrate, and a second layer formed of a hydrophobic resin and partially covering the first layer formed of the photocatalytic oxide,
   the photocatalytic oxide being hydrophilifiable in response to photoexcitation,
   the outermost surface of the surface layer having hydrophobic resin and photocatalytic oxide present in an exposed state on the outermost surface of the surface layer, such that the outermost surface presents areas of exposed photocatalytic oxide and areas of exposed hydrophobic resin,
   wherein the areas of exposed hydrophobic resin and the areas of exposed photocatalytic oxide prevent both hydrophilic materials and hydrophobic materials from being deposited on the surface of the member, thus permitting the surface of the member to be kept clean.

5. The member according to claim 4, wherein the first layer of the surface layer formed of the photocatalytic oxide further comprises an inorganic oxide which, together with the hydrophobic resin and the photocatalytic oxide, is present in an exposed state on the outermost surface of the surface layer, the photocatalytic oxide functioning to hydrophilify the inorganic oxide by photocatalytic action in response to photoexcitation.

6. The member according to any one of claims 2 and 5, wherein the inorganic oxide is selected from the group consisting of silica, alumina, water glass, silicate, aluminosilicate, zirconia, ceria, tin oxide, calcia, magnesia, and amorphous titania.

7. The member according to any one of claims 1, 2, 4 and 5, wherein the hydrophobic resin is selected from the group consisting of a fluororesin, an acrylic resin, a urethane resin, a polyester resin, a vinyl resin, PET, and an acrylic silicone.

8. The member according to any one of claims 1, 2, 4 and 5, wherein the hydrophobic portion and the hydrophilic portion each are present in at least one place per 10 to 100 nm$^2$ on the outermost surface of the surface layer.

9. The member according to claim 8, which has such a property that a biopolymer is less likely to be deposited thereon.

10. The member according to claim 9, which is used as an anti-thrombotenic material, an anti-protein-depositable material, and an anti-lipid-adhesion material.

11. The member according to any one of claims 1, 2, 4 and 5, wherein the hydrophobic portion and the hydrophilic portion each are present in at least one place per 10 nm$^2$ to 1 $\mu$m$^2$ on the outermost surface of the surface layer.

12. The member according to any one of claims 1, 2, 4 and 5, wherein the hydrophobic portion and the hydrophilic portion each are present in at least one place per 1 mm$^2$ on the outermost surface of the surface layer.

13. The member according to claim 12, which has such a property that a strain derived from suspended smoke and soot in the air is less likely to be deposited thereon, or a stain, once deposited thereon, can be easily removed.

14. The member according to claim 13, which is used as a building material for outdoors, a cover for a solar battery, a cover for a heat collector for a solar water heater, a handrail, an internal wall for a tunnel, a sound insulating wall, a sound barrier, a guard fence, a road structure, a blind, an insulator, a wheel, or a body for a vehicle.

15. The member according to any one of claims 1, 2, 4 and 5, wherein the surface layer prevents growth of water droplets deposited on the surface thereof.

16. The member according to any one of claims 1, 2, 4 and 5, wherein water droplets or ice and snow, when deposited on the surface layer, can be easily removed.

17. The member according to any one of claims 1 and 4, wherein the photocatalytic oxide is selected from the group consisting of anatase form of titanium oxide, rutile form of titanium oxide, zinc oxide, tin oxide, ferric oxide, dibismuth trioxide, tungsten trioxide, and strontium titanate.

* * * * *